(12) United States Patent
Kataoka (10) Patent No.: US 8,694,743 B2
(45) Date of Patent: Apr. 8, 2014

(54) INFORMATION PROCESSING APPARATUS AND METHOD OF BACKING UP MEMORY IN SAID APPARATUS

(75) Inventor: Junnosuke Kataoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1297 days.

(21) Appl. No.: 12/098,727

(22) Filed: Apr. 7, 2008

(65) Prior Publication Data

US 2011/0047339 A1    Feb. 24, 2011

(30) Foreign Application Priority Data

Apr. 11, 2007    (JP) ................ 2007-104215

(51) Int. Cl.
*G06F 3/06*    (2006.01)
(52) U.S. Cl.
USPC .................. 711/162; 711/E12.103
(58) Field of Classification Search
USPC ........................................ 711/162
See application file for complete search history.

(56) References Cited

U.S. PATENT DOCUMENTS 5,719,816 A * 2/1998 Ishikawa .............. 365/229

FOREIGN PATENT DOCUMENTS

| JP | 04-000648 A | 1/1992 |
|---|---|---|
| JP | 11-168585 A | 6/1999 |
| JP | 2002-099390 A | 4/2002 |
| JP | 2002-209074 | 7/2002 |

OTHER PUBLICATIONS

The above references were cited in a Dec. 5, 2011 Japanese Office Action, which is enclosed without an English Translation, that issued in Japanese Patent Application No. 2007-104215.

* cited by examiner

*Primary Examiner* — Kenneth Lo
(74) *Attorney, Agent, or Firm* — Cowan, Liebowitz & Latman, P.C.

(57) ABSTRACT

Disclosed is an information processing apparatus having a first memory and being capable of installing a second memory. The apparatus moves target data to be backed up stored in the first memory into the second memory, in a case that the second memory is installed in the information processing apparatus, and releases an memory area of the first memory in which the target data was stored, and sets the second memory to be backed up in a case that the second memory is installed in the information processing apparatus, and sets the first memory to be backed up in a case that the second memory is not installed in the information processing apparatus.

4 Claims, 7 Drawing Sheets

INFORMATION PROCESSING APPARATUS AND METHOD OF BACKING UP MEMORY IN SAID APPARATUS

BACKGROUND OF THE INVENTION

1. Field of the Invention

The present invention relates to an information processing apparatus in which a plurality of memory boards have been installed and are capable of being accessed, and to a method of backing up a memory in this apparatus.

2. Description of the Related Art

In a multifunction peripheral having a copy function and a facsimile function, a first memory area that stores image data used by the copy function and a second memory area that stores image data used by the facsimile function are provided as distinct areas. In the case of the copy function, image data that has been scanned by a scanner is stored in the first memory area temporarily, after which the image data is read out and printed (copied). In the case of the facsimile function, received image data or image data to be transmitted is accumulated in the second memory area at the time of memory receive or memory transmit. Even if electric power supply to the main body of the apparatus is cut off before the image data in the second memory area is printed or transmitted, it is required that the content of the image data be retained. For this reason, the memory is backed up by a battery. However, since the data in the first memory area and data in a work area for a program currently being run does not require to be retained when the electric power supply is cut off, such data is not backed up by a battery.

The electric power needed to back up a memory increases in proportion to the capacity of the memory backed up. In a case where memory capacity has been extended, therefore, the length of backup time using the same battery is shortened. Depending upon memory capacity, therefore, it becomes necessary to increase the capacity of the backup battery. A method of solving this problem has been proposed. Specifically, the method is such that even though memory capacity has been extended, only a basic memory area is backed up and the extended memory is not backed up [see Japanese Patent Laid-Open No. 2002-209074 (Document 1)]. According to Patent Document 1, memory area for facsimile and a program work area are always placed in the basic memory. If extended memory has been installed, then an image memory area for copying (expansion, rotation, sorting, etc.) is placed in the extended memory.

With the method of Document 1, however, since the work area for program execution is placed in the basic memory, much of the capacity of the basic memory must be reserved as the work area even though the extended memory has been installed. As a result, a problem which arises is that even though the extended memory has been installed, sufficient image memory area for facsimile cannot be acquired because the memory area for facsimile is placed in the basic memory.

SUMMARY OF THE INVENTION

An aspect of the present invention is to eliminate the above-mentioned problems encountered in the prior art.

Another aspect of the present invention is to suppress an increase in battery capacity of a battery necessary for backup by limiting a memory area that is to be backed up.

In accordance with a further aspect of the present invention, it is possible to provide an information processing apparatus, as well as a method of backing up a memory in the apparatus, in which a memory area backed up by a battery is limited and data for which erasure is not desired is stored in the backed-up area, thereby enabling retention of necessary data while limiting the area backed up.

According to an aspect of the present invention, there is provided an information processing apparatus having a first memory and being capable of installing a second memory, the apparatus comprises:

a backup unit configured to back up the first or second memory;

a memory control unit configured to copy target data to be backed up stored in the first memory into the second memory, in a case that the second memory is installed in the information processing apparatus, and to release an memory area of the first memory in which the target data was stored; and a backup control unit configured to set the second memory to be backed up by the backup unit in a case that the second memory is installed in the information processing apparatus, and to set the first memory to be backed up by the backup unit in a case that the second memory is not installed in the information processing apparatus.

According to an aspect of the present invention, there is provided a method of backing up a memory in an information processing apparatus having a first memory and being capable of installing a second memory, the method comprises the steps of:

backing up the first or second memory;

copying target data to be backed up stored in the first memory into the second memory, in a case that the second memory is installed in the information processing apparatus, and releasing an memory area of the first memory in which the target data was stored; and setting the second memory to be backed up in the backing up step in a case that the second memory is installed in the information processing apparatus, and setting the first memory to be backed up in the backing up step in a case that the second memory is not installed in the information processing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

A number of embodiments of the present invention will now be described in detail with reference to the accompanying drawings. The following embodiments are not intended to limit the claims of the present invention.

Figure 1:
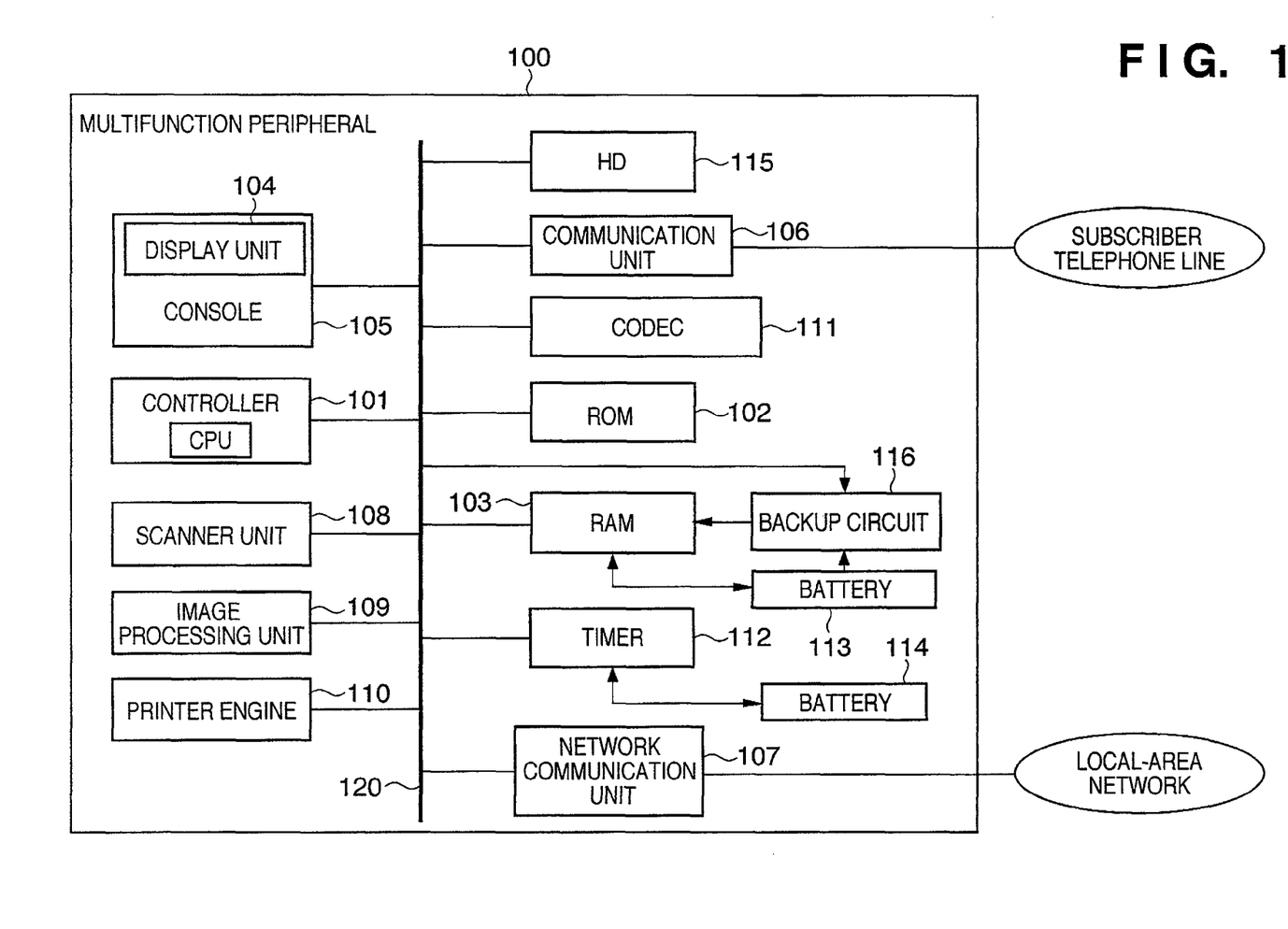
FIG. 1 is a block diagram illustrating the configuration of a multifunction peripheral according to an exemplary embodiment of the present invention.

FIG. 1 is a block diagram illustrating the configuration of a multifunction peripheral (multifunction processing apparatus) 100 according to an embodiment of the present invention.

As shown in FIG. 1, a controller 101 has a CPU and controls the overall operation of the multifunction peripheral 100. A ROM 102 or a hard disk 115 stores a program executed by the controller 101 as well as various data, etc. The program executed by the controller 101 is loaded into a RAM 103 from a ROM 102 or a hard disk 115. With the program having been loaded in the RAM 103, the program is executed under the control of the controller 101. The RAM 103 also provides a work area for storing various data when control processing is executed by the controller 101, a first memory area for storing image data used by a copy function, and a second memory area for storing image data used by a facsimile function. All or part of the RAM 103 is backed up by a battery 113. The RAM 103 is divided into one or more units, which are inserted into and withdrawn from DIMM slots, whereby each unit is rendered removable. The RAM 103 corresponds to a basic memory 203 and an extended memory 204 in FIGS. 2A and 2B.

A timer 112 is for outputting time information. The timer 112 performs a timekeeping operation constantly by being driven by electric power from a battery 114. A console 105 has various keys for user operation and a display unit 104. The latter is constituted by a touch-sensitive panel, displays various information and soft keys for operating the multifunction peripheral 100 and accepts operations performed by the user.

A communication unit 106 performs facsimile (FAX) communication via an analog telephone line. The communication unit 106 has a memory-receive function according to which an image that has been received by facsimile is not directly output to and printed by a printer engine 110 but is printed after being stored temporarily in the RAM 103. The communication unit 106 also has a memory-transmit function according to which image data for facsimile transmission is stored in the RAM 103 temporarily, after which image data is transmitted when a set time arrives. Even if the electric power supply of the main body of the apparatus has been cut off, image data that has been sent or received by facsimile and stored in the RAM 103 is retained for a fixed period of time by electric power supplied from the battery 113.

A scanner unit 108 reads a document and generates image data corresponding to the document image. An image processing unit 109 applies image processing to image data generated by the scanner unit 108 and image data to be printed. The printer engine 110 prints an image on a printing sheet based upon the image data. In the case of a copying operation, the printer engine 110 prints a copy image based upon image data that has been read by the scanner unit 108. In case of a printing operation, the printer engine 110 prints an image based upon image data that has been received from a personal computer (not shown) via a network.

A network communication unit 107 controls the sending and receiving of data between the apparatus and a network. The network communication unit 107 receives print data from a personal computer (not shown) via the network and transfers image data, which has been read and generated by the scanner unit 108, to the personal computer, etc., via the network. A codec 111 encodes image data, which has been generated by the scanner unit 108, when the image data is transmitted by the communication unit 106, and decodes image data that has been received by the communication unit 106. Further, when a copying operation is performed, the codec 111 encodes image data, which has been generated by the scanner unit 108, in order that the image data may be stored on the hard disk 115, and decodes encoded image data that has been stored on the hard disk 115. A backup circuit 116 for the RAM 103 has a circuit of the kind shown in FIG. 4B or FIG. 7, by way of example.

A CPU bus 120 interconnects the controller 101, ROM 102, RAM 103, console 105, communication unit 106, network communication unit 107, scanner unit 108, image processing unit 109, printer engine 110 and codec 111. The CPU bus 120 is the general term for an address bus that transfers an address signal, a control bus that transfers a control signal and a data bus that transfers various data.

Figure 2A:
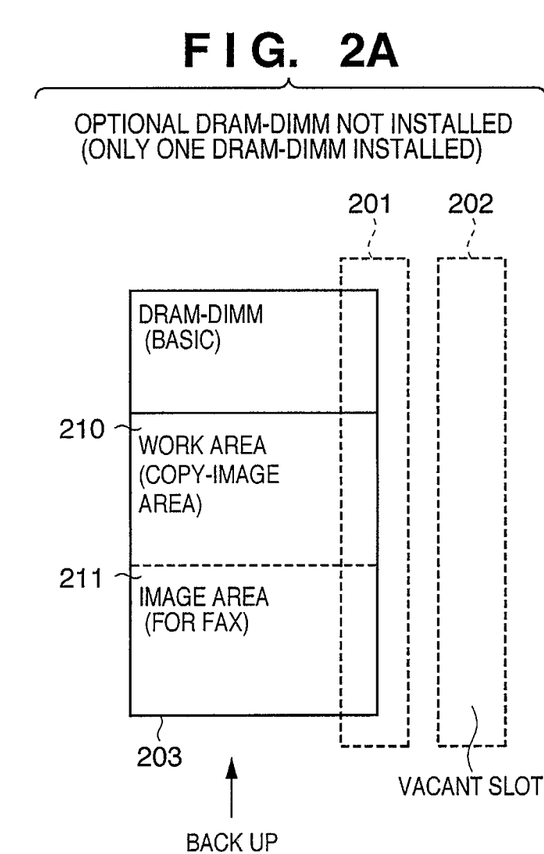
FIGS. 2A and 2B are diagrams useful in describing RAM configurations in the multifunction peripheral according to this embodiment.
Figure 2B:
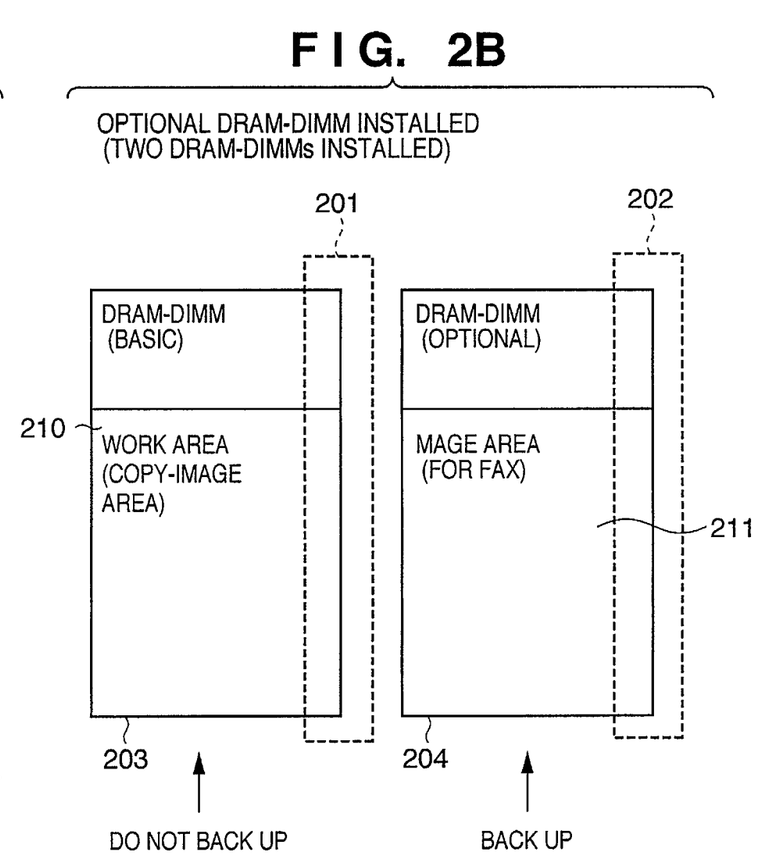

FIGS. 2A and 2B are diagrams useful in describing RAM configurations in the multifunction peripheral 100 according to this embodiment. In the first embodiment, the RAM 103 is divided into two memories, namely a basic memory and an extended memory, and a basic memory board (referred to as a "basic memory" below) and extended-memory board (referred to as an "extended memory" below) are both capable of being inserted and withdrawn in DIMM form. In FIGS. 2A and 2B, reference numerals 201 and 202 denote RAM-DIMM slots for installing a basic memory 203 and an extended memory 204, respectively. In a case that the extended memory 204 is installed, the RAM 103 corresponds to the basic memory 203 and the extended memory 204. In a case that the extended memory 204 is not installed, the RAM 103 corresponds to the basic memory 203. It should be noted that although the board on which the basic memory 203 is mounted is adopted as a first memory board and the board on which the extended memory 204 is mounted is adopted as a second memory board, this does not impose a limitation upon the present invention.

FIG. 2A illustrates a state in which only the basic memory 203 (first memory) has been installed and not the extended memory. FIG. 2B illustrates a state in which both the basic memory 203 and extended memory 204 (second memory) have been installed.

In FIG. 2A, a work area 210 and an image area 211, which stores FAX image data, have been allocated to the installed basic memory 203. The work area 210 includes a memory area in which the controller 101 expands and executes a program, and a memory area for storing image data used by the copy function. The image area 211 is a memory area for storing image data used by the facsimile function.

In FIG. 2B, a work area in which the controller 101 expands and executes a program and the work area 210 that stores the image data used by the copy function have been allocated to the basic memory 203. The image area 211 for storing image data used by the facsimile function has been allocated to the extended memory 204.

Further, in the first embodiment, the memory backed up by the battery 113 differs depending upon whether the extended memory 204 is or is not installed. That is, in FIG. 2A, the basic memory 203 is backed up by the battery 113. In FIG. 2B, only the extended memory 204 is backed up by the battery 113 and not the basic memory 203.

By adopting this arrangement, the image area 211 that stores the image data used by the facsimile function is backed up by the battery 113 at all times. Further, if the capacity of the basic memory 203 and the capacity of the extended memory 204 are the same, then memory capacity backed up by the battery 113 is the same regardless of whether or not the extended memory 204 is installed. Accordingly, even in a case where the extended memory 204 has been installed, the electric power necessary for battery backup is the same and the electric power of the battery 113 consumed does not change. This means that there is no curtailment of backup time.

Figure 3:
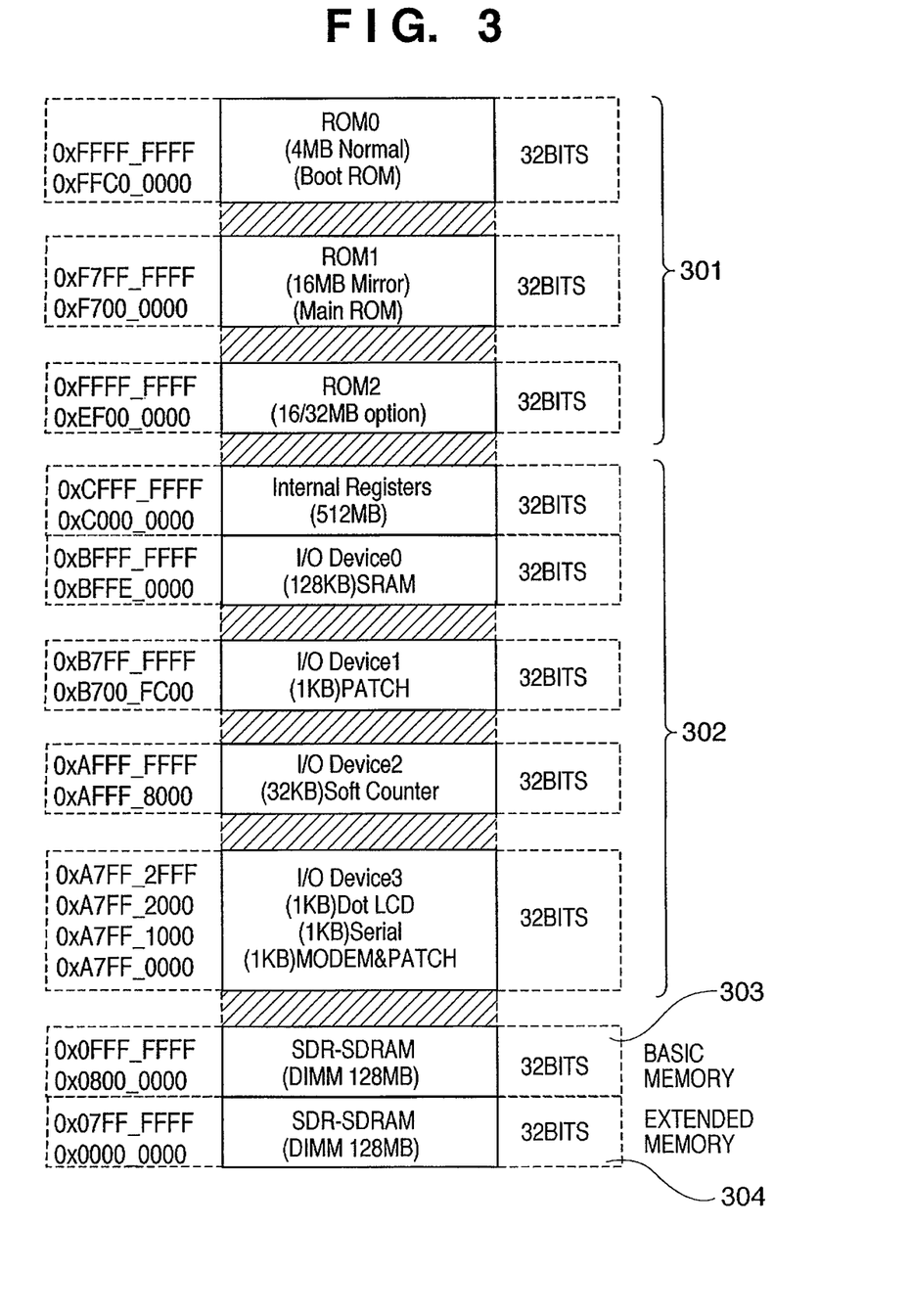
FIG. 3 is a diagram useful in describing a memory map as seen from the controller of the multifunction peripheral according to this embodiment.

FIG. 3 is a diagram useful in describing a memory map as seen from the controller 101 of the multifunction peripheral according to this embodiment. The address spaces of the basic memory 203 and extended memory 204 have been laid out in the memory map.

Shown in FIG. 3 are address space 301 of the ROM 102 and address space 302 for the registers and I/O map of the controller 101. Address space 303 of the basic memory 203 is 128 MB (megabytes) from address 8000000 to address FFFFFFF, and address space 304 of the extended memory 204 is 128 MB from address 0000000 to address 7FFFFFF.

First Embodiment

Figure 4A:
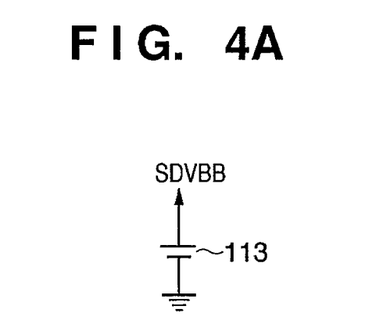
FIGS. 4A and 4B are diagrams illustrating an example of a RAM backup circuit in a multifunction peripheral according to a first embodiment of the present invention.
Figure 4B:
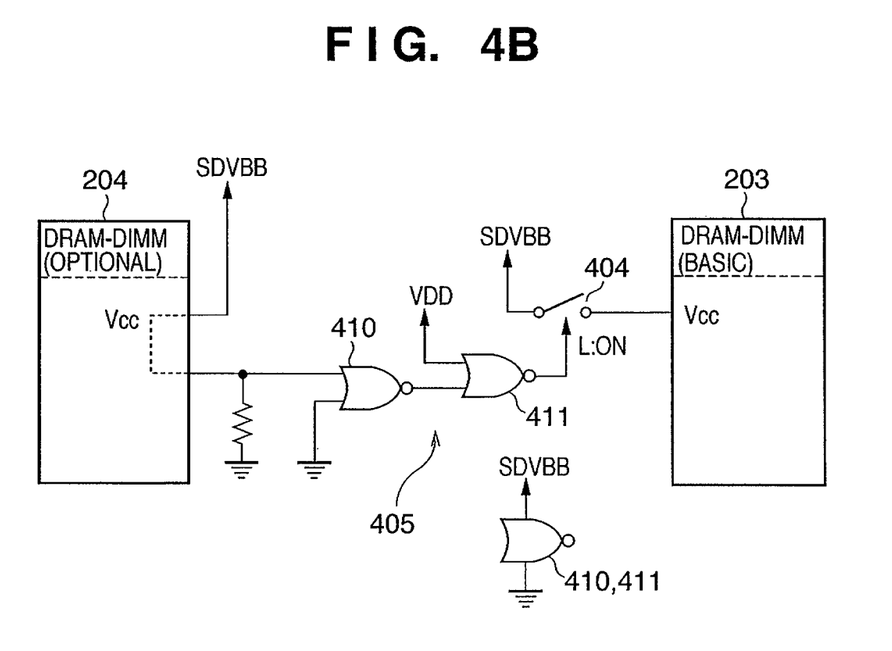

FIGS. 4A and 4B are diagrams illustrating an example of a backup (backup control) circuit of the RAM 103 in a multifunction peripheral 100 according to a first embodiment.

FIG. 4A illustrates the backup battery 113 and FIG. 4B an example of the backup circuit 116.

Backup voltage (SDVBB: +3.3 V) supplied from the battery 113 is supplied to a Vcc terminal of the basic memory 203 or to a Vcc terminal of the extended memory 204, depending upon conditions. A switch 404 supplies the voltage SDVBB to the Vcc terminal of the basic memory 203 when the switch 404 is ON (closed) but does not supply the voltage SDVBB to the Vcc terminal of the basic memory 203 when the switch 404 is OFF (open). The extended memory 204 has a terminal for returning the voltage SDVBB from the battery 113, which is supplied to the Vcc terminal, to a main board (the board on which the CPU of the controller 101 has been mounted). The signal returned is input to the switch 404 via a logic circuit 405 (mounted on the main board on which the CPU of the controller 101 has been mounted). A VDD signal, which is input to the logic circuit 405, is connected to the electric power supply voltage of +3.3 V, which level falls low when the main electric power supply of the apparatus has been turned off. The logic circuit 405 includes NOR gates 410 and 411, both of which are driven by the backup voltage SDVBB supplied from the battery 113. The switch 404 is turned ON (closed) when the output of the NOR gate 411 falls to the low level.

In the first embodiment, the basic memory 203 is always installed, and there are cases where the extended memory 204 is and is not installed.

The case where the extended memory 204 has not been installed will be described. In this case, the voltage SDVBB supplied from the battery 113 via the extended memory 204 does not enter the NOR gate 410. Consequently, the two inputs to the NOR gate 410 are both at the low level and the output of the NOR gate 410 is at the high level. Accordingly, regardless of whether the electric power supply of the main body of the apparatus is ON or OFF, the output of the NOR gate 411 is at the low level, the switch 404 remains ON (closed) and the backup voltage SDVBB continues to be supplied to the basic memory 203 from the battery 113. It should be noted that with the electric power supply of the multifunction peripheral 100 in the ON state, the backup voltage SDVBB is the same as the electric power supply voltage VDD.

Next, the case where the extended memory 204 has been installed will be described.

In this case, the backup voltage SDVBB from the battery 113 is returned to the main board via the extended memory 204 and enters the NOR gate 410. As a result, the output of the NOR gate 410 falls to the low level. In a case that the electric power supply of the main body of the apparatus is OFF (VDD=0), the two inputs to the NOR gate 411 both fall to the low level and the output of the NOR gate 411 attains the high level, thereby turning the switch 404 OFF (open). Further, in a case that the electric power supply of the main body of the apparatus is ON (VDD=high level), the output of the NOR gate 411 falls to the low level and the switch 404 is turned ON (closed).

Thus, in a case that the electric power supply of the main body of the apparatus is turned OFF, the basic memory 203 is backed up by the battery 113 if the extended memory 204 has not been installed. On the other hand, if the extended memory 204 has been installed, then the supply of electric power from the battery 113 to the basic memory 203 is interrupted in a case that the electric power supply of the main body is turned OFF. Consequently, only the extended memory 204 is backed up by the battery 113 and not the basic memory 203. Further, with the electric power supply of the main body in the ON state, the switch 404 is turned ON and the electric power from the battery 113 is supplied to the basic memory 203 as well, regardless of whether or not the extended memory 204 has been installed.

In accordance with the first embodiment, as described above, with the extended memory 204 installed, only the extended memory 204 is backed up by the battery 113 automatically if the electric power supply of the apparatus is turned off. This means that even though the extended memory 204 has been installed, consumption of battery power can be suppressed and curtailment of necessary backup time prevented by suppressing an increase in the memory area to be backed up. Data to be backed up is retained in the installed extended memory 204 and only data for which erasure is permissible at cut-off of electric power is held in the basic memory 203 not backed up. As a result, the effects of loss of data due to cut-off of electric power can be diminished.

Second Embodiment

A second embodiment of the present invention will be described next.

In the second embodiment, a memory area in which facsimile image data is stored is sensed when the electric power supply of the main body of the multifunction peripheral is turned off. Only this area in which the image data is stored is backed up by the battery 113. It should be noted that the hardware configuration of the multifunction peripheral 100 in the second embodiment is the same as that of the multifunction peripheral of the first embodiment and need not be described again.

Figure 5:
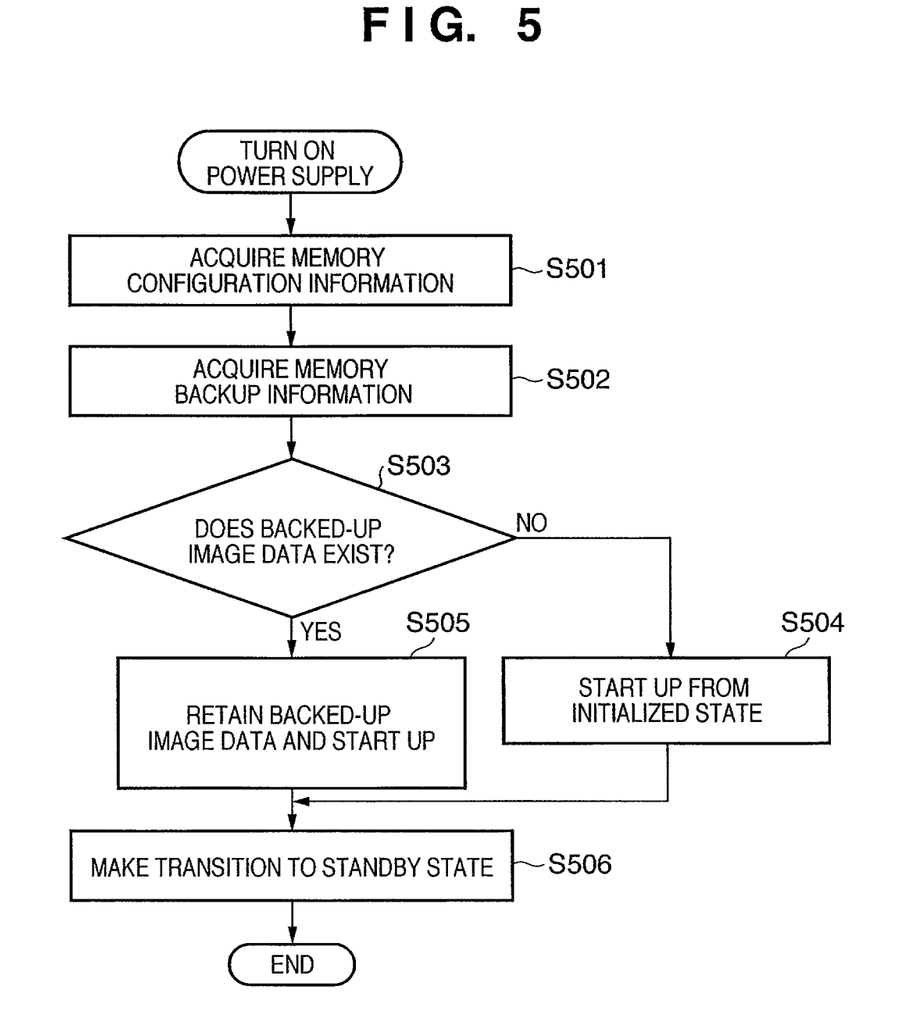
FIG. 5 is a flowchart explaining operation when an electric power supply is turned on in a multifunction peripheral according to a second embodiment of the present invention.

FIG. 5 is a flowchart illustrating operation in a case that the electric power supply is turned on in the multifunction peripheral 100 according to the second embodiment of the present invention. The program that executes this processing is stored in the RAM 103 at the time of execution and is executed under the control of the CPU of controller 101.

This processing is started in response to the electric power supply of the multifunction peripheral 100 being turned on. First, in step S501, the controller 101 determines whether or not the extended memory 204 has been installed and acquires memory configuration information. Next, in step S502, the controller 101 obtains memory backup information. Then, in step S503, the controller 101 determines whether or not image data backed up by the battery 113 exists. If there is no backed up image data, the process advances to step S504. Here the controller 101 executes an ordinary initializing operation, namely start-up processing for booting from an initial state. The process then advances to step S506, where the system transitions to a standby state.

If image data backed-up by the battery 113 is found to exist in step S503, on the other hand, the process advances to step S505. Here the controller 101 executes processing for retaining the image data in the backed-up memory area and for booting up the system. The system then transitions to the standby state in step S506.

Thus, in the second embodiment, only the memory area in which image data to be backed up has been stored is backed up. Data in areas other than memory areas in which backed-up image data has been stored is indeterminate.

Figure 6:
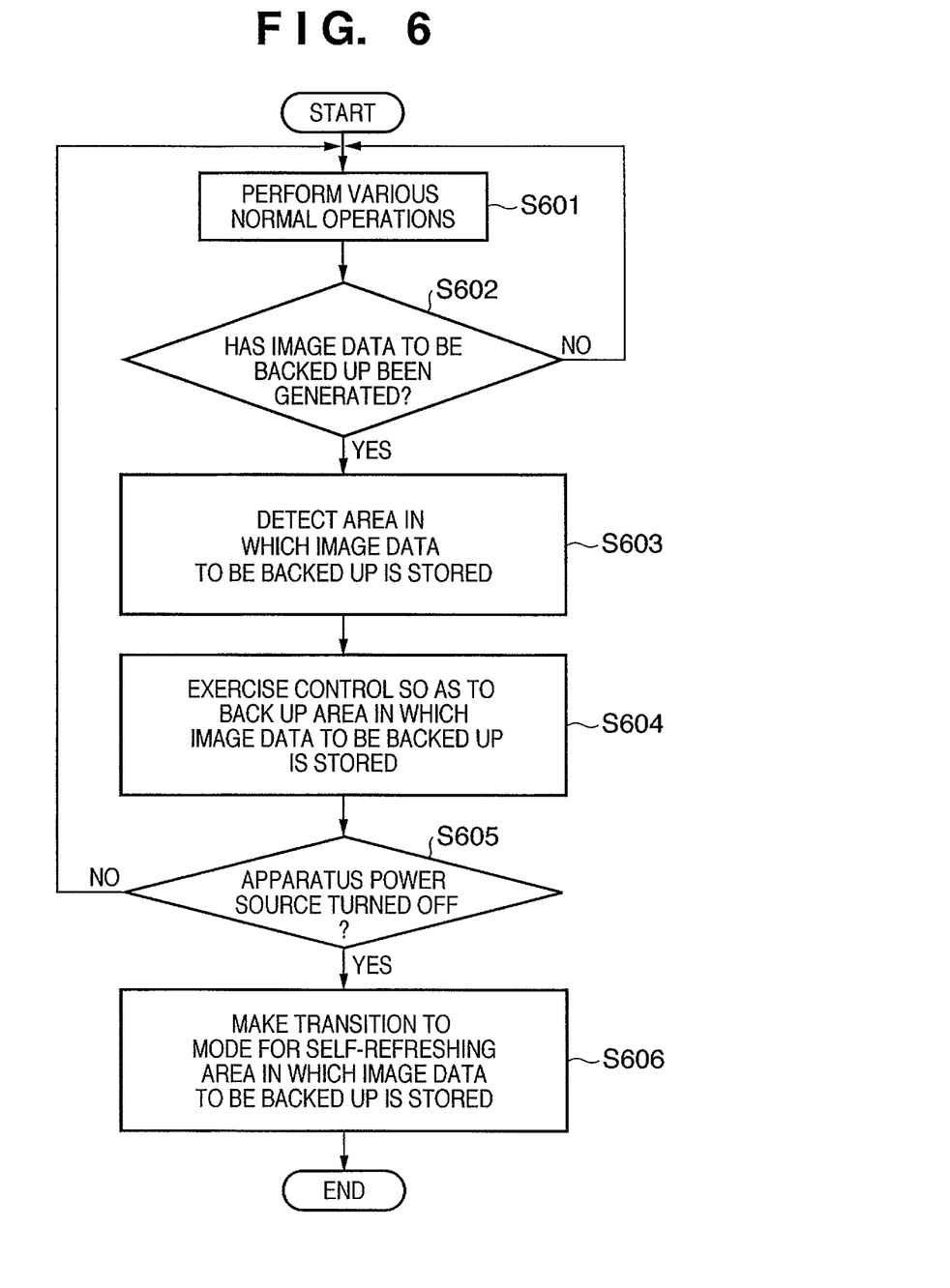
FIG. 6 is a flowchart explaining operation when an electric power supply is turned off in a multifunction peripheral according to the second embodiment of the present invention.

FIG. 6 is a flowchart illustrating operation when the electric power supply is turned off in the multifunction peripheral 100 according to the second embodiment of the present invention. The program that executes this processing is stored in the RAM 103 at the time of execution and is executed under the control of the CPU of controller 101.

At step S601, various operations such as a copy operation and facsimile operation are carried out. At step S602, the controller 101 determines whether or not image data to be backed up (e.g., facsimile data received in memory or facsimile data whose transmission is specified by a timer) has been generated. If image data to be backed up has not been generated, the process advances to step S601 and normal operation is continued. If it is determined in step S602 that image data to be backed up has been generated, the process advances to step S603 and the controller 101 discriminates the memory area in which the image data to be backed up is stored. Next, the process proceeds to step S604, at which the controller 101 controls the backup circuit so as to back up the memory area in which the image data to be backed up is stored. Next, in step S605, the controller 101 senses whether or not the electric power supply of the apparatus has been turned off. If the electric power supply has not been turned off, the process advances to step S601 and normal operation is continued. If it is sensed in step S605 that the electric power supply of the apparatus has been turned off, then the process proceeds to step S606, where the memory area in which the image data to be backed up is stored transitions to a self-refresh mode to prepare for turn-off of the electric power supply.

Figure 7:
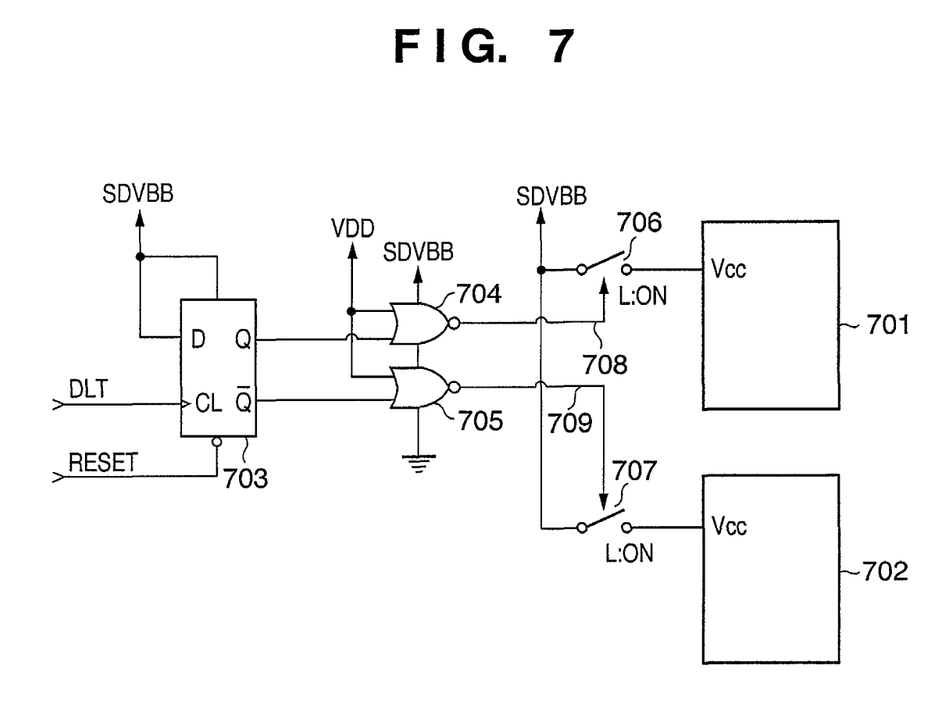
FIG. 7 is a circuit diagram for describing a backup circuit according to the second embodiment.

FIG. 7 is a circuit diagram for describing the backup circuit 116 according to the second embodiment.

Memory boards 701, 702 in FIG. 7 may be the above-mentioned basic memory 203 and extended memory 204 or may be two extended memories separate from the extended memory 204. The circuit further includes a flip-flop 703 and NOR gates 704, 705. The flip-flop 703 and the NOR gates 704, 705 are operated by electric power supplied from the battery 113. In a manner similar to that of the switch 404 in FIG. 4B, switches 706, 707 turn ON (are closed) when corresponding control signals 708, 709 fall to the low level and turn OFF (are opened) when the corresponding control signals 708, 709 attain the high level.

When the electric power supply of the multifunction peripheral 100 is on, the power supply voltage VDD is being supplied from the electric power supply of the main body of the apparatus. High-level signals therefore are input to the NOR gates 704, 705, the outputs of both of which are at the low level. Accordingly, with the switches 706, 707 in the closed state, the memory boards 701, 702 are being supplied with the voltage SDVBB. In a manner similar to that of the first embodiment, the voltage SDVBB supplied from the battery 113 is the same as the power supply voltage VDD in a case where the electric power supply of the multifunction peripheral 100 has been turned on.

A DLT signal and a RESET signal being applied as inputs to the flip-flop 703 are both supplied from the CPU of the controller 101. That is, in a case where only the memory board 701 is backed up with the electric power supply of the multifunction peripheral 100 in the off state, the CPU outputs the DLT signal with the RESET signal placed at the high level. As a result, the Q output of the flip-flop 703 attains the high level and the output of the NOR gate 704 falls to the low level, thereby turning on the switch 706 (closed). On the other hand, since a signal that is the inverse of the Q output of the flip-flop 703 is input to the NOR gate 705, this input falls to the low level and the output of the NOR gate 705 attains the high level, thereby turning off the switch 707 (opened). Thus, only the memory board 701 is backed up by the battery 113.

Conversely, in a case where only the memory board 702 is backed up with the electric power supply of the multifunction peripheral 100 in the off state, the CPU places the RESET signal at the low level. As a result, the Q output of the flip-flop 703 falls to the low level, Q/(the inverse of Q) attains the high level, the output of the NOR gate 705 falls to the low level and the switch 707 is turned ON (closed). Thus, only the memory board 702 is backed up by the battery 113.

Accordingly, in step S604 in FIG. 6, the DLT signal or RESET signal is output to thereby change over the ON/OFF states of the switches 706, 707 so as to back up the memory area in which image data to be backed up is stored.

Although a case where there are two memory boards has been described in the second embodiment, a greater number of memory boards is permissible.

Third Embodiment

In a third embodiment of the present invention, a memory area in which image data to be backed up has been stored is sensed beforehand when the electric power supply of the multifunction peripheral 100 is turned off. In addition, backup time is calculated based upon the volume of this image data. It may be so arranged that the memory board to be backed up is changed over in accordance with this backup time.

The operation flowchart according to the third embodiment of the present invention basically is the same as the flow of operation according to the second embodiment shown in FIGS. 5 and 6.

In step S604 in FIG. 6, however, the volume of image data to be backed up is obtained and the length of time over which this image data can be backed up is calculated. On the basis of the calculated time, the memory board to be backed up is decided and a changeover is made so as to back up this memory board by the battery. In this case, if the volume of image data to be backed up is very large and it is determined that time during which the data can be backed up is too short, then a situation in which this image data is not backed up arises.

Further, the configuration of the backup circuit in which the memory board to be backed up is changed over is the same as that of the second embodiment described above.

Further, although a multifunction peripheral has been described in the foregoing embodiments, the invention is not limited to a multifunction peripheral and may be applied to an apparatus (such as a personal computer) in which a plurality of memory boards can be installed. An apparatus such as a multifunction peripheral or personal computer is referred to generically as an information processing apparatus.

Other Embodiments

Although embodiments of the present invention have been described in detail, the present invention may be applied to a system constituted by a plurality of devices or to an apparatus comprising a single device.

It should be noted that the present invention can also be attained by supplying a software program, which implements the functions of the foregoing embodiments, directly or remotely to a system or apparatus, reading the supplied program with a computer of the system or apparatus, and then executing the program codes. In this case, so long as the system or apparatus has the functions of the program, the mode of implementation need not be a program.

Accordingly, since the functional processing of the present invention is implemented by computer, the program codes per se installed in the computer also implement the present invention. In other words, the claims of present invention also cover a computer program per se that is for the purpose of implementing the functional processing of the present invention. In this case, so long as the system or apparatus has the functions of the program, the form of the program, e.g., object code, a program executed by an interpreter or script data supplied to an operating system, etc., does not matter.

Examples of recording media for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the program can also be supplied by connecting to a website on the Internet using the browser of a client computer and downloading the program from the website to a recording may be the computer program of the present invention itself or a compressed file containing an automatic installation function. Further, implementation is possible by dividing the program codes constituting the program of the present invention into a plurality of files and downloading the files from different websites. In other words, a WWW server that downloads, to multiple users, the program files that implement the functional processing of the present invention by computer also is covered by the claims of the present invention.

Further, it is also permissible to adopt a form in which the program of the present invention is encrypted and stored on a storage medium such as a CD-ROM and the storage medium is distributed to users. In this case, users who meet certain requirements are allowed to download decryption key information from a website via the Internet, and the program decrypted using this key information is installed in a computer in executable form.

Further, implementation is possible also in a form other than one in which the functions of the foregoing embodiments are implemented by having a computer execute a program that has been read. For example, based upon indications in the program, an operating system or the like running on the computer may perform all or a part of the actual processing so that the functions of the foregoing embodiments can be implemented by this processing.

Furthermore, it may be so arranged that a program that has been read from a recording medium is written to a memory provided on a function expansion board inserted into the computer or provided in a function expansion unit connected to the computer. In this case, a CPU or the like provided on the function expansion board or function expansion unit subsequently performs some or all of the actual processing based upon the indications in the program, and the functions of the foregoing embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-104215, filed Apr. 11, 2007, which is hereby incorporated by reference herein in its entirety.

What is claimed is:

1. An information processing apparatus having a first memory and being capable of installing a second memory, said apparatus comprising:
   a backup unit configured to back up the first or second memory; and
   a backup control unit configured to set the first memory to be backed up by the backup unit in a case that the second memory is not installed in the information processing apparatus when an electric power supply of the information processing apparatus is turned off, and to set the first memory not to be backed up by the backup unit and to set the second memory to be backed up by the backup unit in a case that the second memory is installed in the information processing apparatus when the electric power supply of the information processing apparatus is turned off, wherein the setting of the first memory to be backed up or the second memory to be backed up is dependent only on whether the second memory is installed or not when the power supply is turned off.

2. An apparatus according to claim 1, wherein the first memory is a basic memory of the information processing apparatus and the second memory is an extended-memory.

3. A method of backing up a memory in an information processing apparatus having a first memory and being capable of installing a second memory, said method comprising the steps of:
   backing up the first or second memory; and
   setting the first memory to be backed up in the backing up step in a case that the second memory is not installed in the information processing apparatus when an electric power supply of the information processing apparatus is turned off, and setting the first memory not to be backed up in the backing up step and setting the second memory to be backed up in the backing up step in a case that the second memory is installed in the information processing apparatus when the electric power supply of the information processing apparatus is turned off, wherein the setting of the first memory to be backed up or the second memory to be backed up is dependent only on whether the second memory is installed or not when the power supply is turned off.

4. A method according to claim 3, wherein the first memory is a basic memory of the information processing apparatus and the second memory is an extended-memory.

* * * * *